(No Model.)

D. DUNN.
AIR BRAKE FOR RAILWAY CARS.

No. 546,510. Patented Sept. 17, 1895.

Witnesses
P. H. Chagle.
L. Douville.

Inventor
Dennis Dunn
By John A. Wiedersheim
Attorney

ANDREW B. GRAHAM. PHOTO-LITHO. WASHINGTON. D.C.

UNITED STATES PATENT OFFICE.

DENNIS DUNN, OF MAHANOY CITY, ASSIGNOR OF FORTY-NINE ONE-HUNDREDTHS TO JOHN E. REYBURN, OF PHILADELPHIA, PENNSYLVANIA.

AIR-BRAKE FOR RAILWAY-CARS.

SPECIFICATION forming part of Letters Patent No. 546,510, dated September 17, 1895.

Application filed December 21, 1894. Serial No. 532,552. (No model.)

*To all whom it may concern:*

Be it known that I, DENNIS DUNN, a citizen of the United States, residing at Mahanoy City, in the county of Schuylkill, State of Pennsylvania, have invented a new and useful Improvement in Air-Brakes for Railway-Cars, which improvement is fully set forth in the following specification and accompanying drawings.

My invention consists of an air-brake wherein an air-compressor is adapted to be continuously operated by the wheel of a car and the air employed to actuate the brakes only as required.

It also consists of a whistle or alarm attachment, as will be hereinafter set forth.

Figure 1:
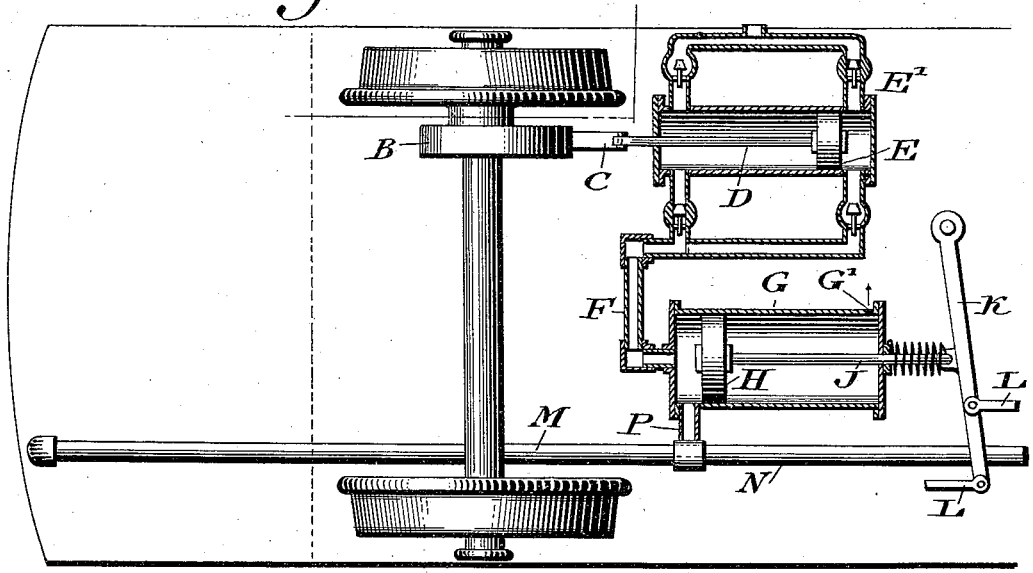
Figure 1:
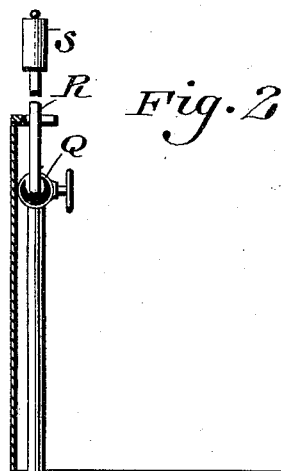
Figure 2:
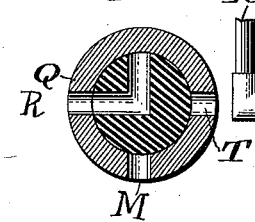
Figure 3:
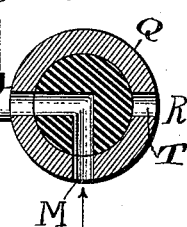
Figure 4:
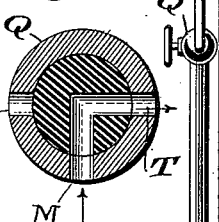
Figure 5:
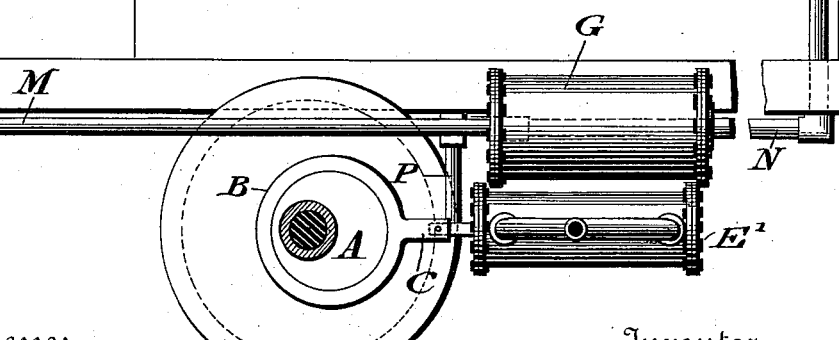

Figure 1 represents a bottom plan view of an air-brake embodying my invention. Fig. 2 represents a side elevation thereof. Figs. 3, 4, and 5 are sectional views of the cock employed, showing different positions of the plug of the same.

Similar letters of reference indicate corresponding parts in the several figures.

Referring to the drawings, A designates an eccentric, which is secured to the hub of a car-wheel, so as to be rotated by the same, said eccentric being encircled by a yoke B, which is connected by an arm C with the rod D of the piston E of the air-compressor, the discharge-pipe F of which opens into the cylinder G, which contains the piston H, whose rod J is attached to the lever K of a suitable brake rigging or mechanism, only the connecting-rods L of which are shown.

M and N designate air-conveying pipes, which are connected by a pipe P with the cylinder G at the end where the pipe F is attached, said pipes M and N leading to the opposite ends of the car, where each of said pipes is provided with a three-way cock Q, the shell of which has attached to it the pipe R, which is provided with a whistle S, it being noticed that the plug of said cock has its ports so disposed as to be in communication with said pipe R or with the atmosphere by means of a discharge-port T, or said plug may close the pipe N, as shown in Fig. 3. The handle of the cock is within reach of a motor-man or brakeman on the platform of the car.

The operation is as follows: When a car is running, the cock of the pipe N, which is at the rear of the car, is closed, and that of the pipe M at the front of the car is opened, and it will now be seen that the air-compressor is continuously operated and air is directed by the pipe F into the cylinder G, and from thence through the pipe P into the pipe M, and discharged into the atmosphere, as the the front cock has its plug in the position shown in Fig. 5. Should it be desired to blow the whistle, the cock is turned to the position shown in Fig. 4, the air then passing into the pipe R and so reaching the whistle, whereby the same is blown or an alarm is sounded. When it is desired to apply the brakes, the cock is turned, so as to close the pipe M, as shown in Fig. 3, when the air, being prevented from escaping, exerts its pressure on the piston H, the effect of which is communicated to the lever K and rods L, and thus to the brake-shoes. When the brakes are to be relieved, the cock is again turned to the position shown in Fig. 5, whereby the air again escapes into the atmosphere, and the piston H is relieved, and with it the lever K, and consequently the brake rigging or mechanism and shoes. The air in the cylinder G, on the side of the piston thereof opposite to the discharge-pipe F, is permitted to escape through the opening G', and thus not compress on said side.

Having thus described my invention, what I claim as new, and desire to secure by Letters Patent, is—

1. An air compressor having its piston connected with a rotatable axle, a separate cylinder having at one end an inlet pipe leading from said air compressor, and an air opening in its opposite end, a piston in said cylinder connected with a brake mechanism, a pipe leading from the inlet pipe end of the cylinder to a whistle, and a three way cock in said pipe, the casing of said cock having an outlet to the atmosphere, and the parts being combined substantially as described.

2. An air compressor having its piston connected with a rotatable axle, a separate cylinder having an inlet pipe communicating with said air compressor at both ends of the latter, and provided with an air opening, a piston in said cylinder connected with a brake mechanism, the pipe P leading from the inlet pipe end of said cylinder and the pipes M and N communicating with said pipe P, and having cocks, therein, substantially as described.

DENNIS DUNN.

Witnesses:
JOHN A. WIEDERSHEIM,
R. H. GRAESER.